June 29, 1926.
R. A. NELSON
COVER FOR HEADLIGHT RIMS
Filed June 22, 1925
1,590,310
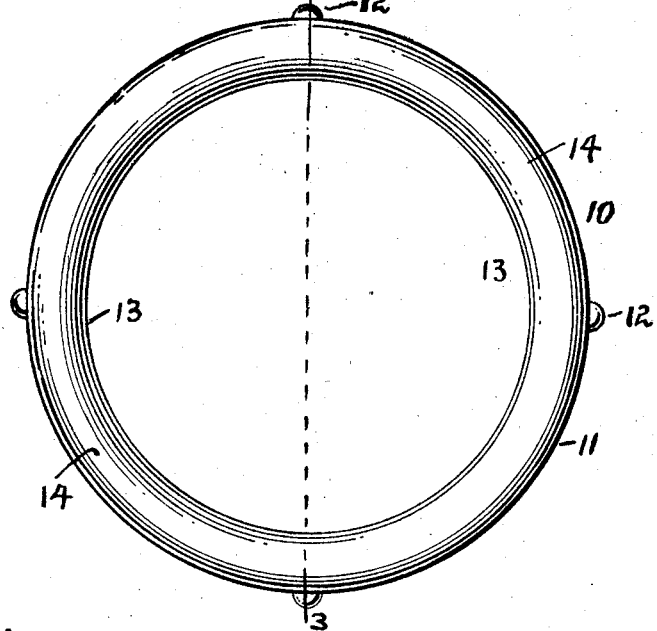
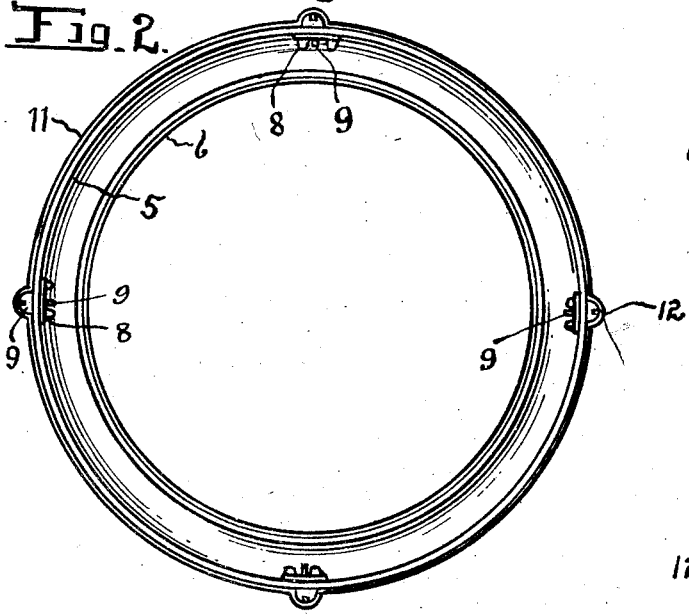
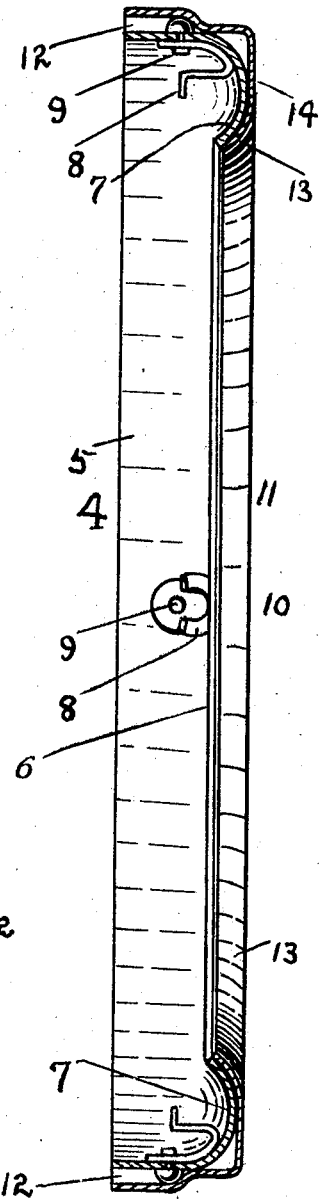
Inventor
Roy A. Nelson
By Hiram A. Sturges
Attorney Patented June 29, 1926.

1,590,310

UNITED STATES PATENT OFFICE.

ROY A. NELSON, OF OMAHA, NEBRASKA.

COVER FOR HEADLIGHT RIMS.

Application filed June 22, 1925. Serial No. 38,722.

This invention relates to a cover for a head-light rim, and has for one of its objects to provide, for the annular rim of an automobile head-light casing, an annular cover having a front, flat surface for reflecting light directed thereto by the lights carried by approaching vehicles, and adapted to be readily seen by those remote therefrom. Another object is to provide a housing or cover for a rim of a head-light which may be conveniently mounted thereon to protect it from the weather, will cover the projecting keepers or rivets, and prevent vibration of the rim on the casing, and may be readily removed when cleaning the parts, said cover to be of such construction that it may be conveniently and practically manufactured at a limited cost.

The invention is for use upon a specific kind of automobile having, approximately, a uniform curvature for the transverse flanges of the casing rims for its head-lights, and consists of the novel and useful combination and arrangement of parts as described herein and claimed, and as illustrated in the accompanying drawings, it being understood that size, proportion of parts, material and minor details in the construction of the cover may be changed, as found to be of advantage, said changes being within the scope of the invention as claimed.

In the drawing, Fig. 1 is a front view of the cover applied to the rim. Fig. 2 is a rear view of the same. Fig. 3 is a sectional view on line 3—3 of Fig. 1, the scale being enlarged. Referring now to the drawing for a more particular description, the invention is shown and described in connection with the rim 4 of a head-light, said rim having a wall 5 of uniform longitudinal curvature provided with an inwardly projecting flange having a longitudinal curvature indicated at 6 and a transverse curvature indicated at 7.

Numerals 8 indicate holders for the transparent disc (not shown) for the head-light, said holders being secured to the wall 5 by means of rivets or other keepers 9. The parts thus mentioned are conventional and may be seen upon all automobiles of a well known manufacture. As clearly shown in the drawing, the flange 7 has a transverse curvature and therefore does not reflect light directed thereto from remote distances, to advantage. Also it will be noted that the keepers 9 which traverse the rim are exposed to the weather.

In order that the objects first mentioned may be attained and that the head-lights may have a more ornamental appearance I provide a cover 10 constructed of any suitable material adapted to reflect light to advantage, said cover consisting of a circular band 11 conforming to the curvature of the wall 5 of the rim and being bent to form caps or recesses 12 at spaced intervals for receiving the heads of the projections, rivets or keepers 9, and provided with an inwardly projecting flange 13 having a curved, terminal part adapted to lie upon the terminal part of the transversely curved flange 7 of said rim. On account of the construction as described a flat, annular facet 14 will be provided which may be readily seen at a considerable distance from the front since it is adapted to reflect light directed thereto from approaching vehicles. The cover may be applied to fit snugly on the rim 4, the caps 12 engaging the heads of the keepers 9 and effectively preventing vibration. Since the recesses 12 open upon the rear edges of the cover and head-light rim 4, said cover may be readily removed whenever required; and since the band 11 may engage the rim 5 with its flange 13 engaging the flange 7 it will be protected from dust, rain or foreign substances.

I claim as my invention,—

1. In a cover for the rim of a head-light casing, said rim having a circular wall with projections outwardly thereof and having an inwardly curved flange, a circular band adapted to fit snugly upon and having recesses for receiving the projections of said circular wall and having an inwardly projecting flange with a transversely curved part for engaging the edge of the inwardly curved flange of said rim, that part of said band between its circular part and its transversely curved part providing a flat, annular facet at the front of said rim.

2. A cover for the rim of a head-light casing having a circular wall with projections outwardly thereof and having an inwardly projecting, transversely curved flange, comprising a circular, metallic band adapted to fit snugly upon said circular wall in engagement with said projections and having a part bent inwardly to provide a flat annular surface at the front of said rim and to provide a transversely curved annular terminal for engaging the flange of said rim.

In testimony whereof, I have affixed my signature.

ROY A. NELSON.